United States Patent [19]

Zeiler

[11] 4,439,776

[45] Mar. 27, 1984

[54] INK JET CHARGE ELECTRODE PROTECTION CIRCUIT

[75] Inventor: Kenneth T. Zeiler, Richardson, Tex.

[73] Assignee: The Mead Corporation, Dayton, Ohio

[21] Appl. No.: 391,893

[22] Filed: Jun. 24, 1982

[51] Int. Cl.[3] ............................................ G01D 18/00

[52] U.S. Cl. ...................................................... 346/75

[58] Field of Search .......................................... 346/75

[56] References Cited

U.S. PATENT DOCUMENTS

| | | | |
|---|---|---|---|
| 4,023,183 | 5/1977 | Takano et al. . | |
| 4,031,563 | 6/1977 | Paranjpe et al. . | |
| 4,035,812 | 7/1977 | Van Breemen et al. . | |
| 4,063,253 | 12/1977 | Ito et al. | 346/75 |
| 4,119,973 | 10/1978 | Stager | 346/75 |
| 4,171,527 | 10/1979 | Osborn et al. | 346/75 |

OTHER PUBLICATIONS

"Ink Jet Charge Plate", K. A. Pedersen, IBM Technical Disclosure Bulletin, vol. 19, No. 2, Jul. 1976, p. 673.

*Primary Examiner*—E. A. Goldberg
*Assistant Examiner*—Gerald E. Preston
*Attorney, Agent, or Firm*—Biebel, French & Nauman

[57] ABSTRACT

A protection circuit monitors each of one or more charge electrodes used in an ink jet printer. The voltage level on each electrode or the current flowing to each electrode is continuously monitored. A fault condition is indicated if the voltage is below a defined level or the current flow is above a defined level. Since fault conditions can be indicated during normal printer operation, the monitored status of the electrodes is keyed or sampled by gated flip-flop circuits during normally stable periods of the operating cycle of the electrodes so that only true faults are detected. If guard ink drops are inserted between successive printing ink drops to form a guard zone, the preferred sampling points are the end portions of the guard zones. Once a defective charge electrode is detected, the associated flip-flop is locked into a fault condition. An output signal of the flip-flop clamps the charge electrode supply voltage and causes a shut-down of the ink jet printer so that no damage will be done to the charge electrodes.

7 Claims, 5 Drawing Figures

INK JET CHARGE ELECTRODE PROTECTION CIRCUIT

BACKGROUND OF THE INVENTION

This invention relates generally to ink jet printers and, more particularly, to an electrical circuit for protecting charge electrodes used in such printers in the event that the electrodes become shorted to ground potential.

In ink jet printers, printing is accomplished by depositing tiny drops of ink on a print receiving medium so that a print character is formed by the collection of drops. An ink jet printer typically includes a print head which defines a fluid reservoir containing electrically conductive ink. An orifice plate mounted on the print head defines a plurality of orifices arranged in one or more rows with each of the orifices communicating with the fluid reservoir. Ink is forced under pressure through the orifices as a plurality of fluid filaments. The filaments elongate and break into streams of tiny ink drops due to mechanical stimulation of the orifice plate or pressure waves which are generated in the fluid reservoir. Accordingly, the print head generates streams of ink drops of substantially uniform size with substantially uniform spacing between the drops.

Charge electrodes are positioned beneath the orifice plate and adjacent to the tip ends of the fluid filaments. Electrical potentials are selectively applied to the charge electrodes to induce corresponding charges of opposite polarity on the drops as they separate from the filament tip ends. The drops then pass downwardly through an electrical deflection field with the drops being deflected by the field to trajectories dependent upon a number of factors which include the charge level carried by the drops. The drops are then either caught or deposited on the print medium at desired locations dependent upon the trajectories of the drops.

The charge electrodes have typically comprised orifices in a charge electrode plate constructed of electrically insulating material with the orifices being lined with a conductive material such as a thin gold film to form the charge electrodes. An alternate construction of the charge electrodes which facilitates start-up and shut-down of the ink jet printer is a notched plate of insulating material with the notches being lined with conductive material to serve as the charge electrodes. Since the formation of the ink filaments and drops require a period of time to stabilize to the small sized, uniformly spaced drops required, the notched electrode plate permits movement away from the orifices until stable operation to thereby prevent fouling of the charge electrodes.

Whatever the construction of the charge electrodes, problems can arise if the electrodes are inadvertently connected to ground potential, for example, by an accumulation of ink on the charge electrode plate. Such ground faults of the charge electrodes can lead to high current levels which can damage or destroy the conductive material of the charge electrodes.

One approach which has been taken to reduce ground fault problems in charge electrodes is shown in IBM Technical Disclosure Bulletin, Volume 19, No. 2, July 1976. A charge electrode plate is therein disclosed having a major portion of the plate coated with an insulating material to resist shorts to ground. While this configuration is an improvement, the exposed charge electrodes may still short to ground potential with possible damage to the charge electrode plate.

A second approach to the reduction of charge electrode damage due to inadvertent ground faults is shown in U.S. Pat. No. 4,035,812, issued July 12, 1977, to Van Breemen et al. and assigned to the same assignee as the present invention. Van Breemen et al. discloses the use of bulk resistive material, such as an epoxy, filled with conductive particles to form the charge electrodes or discrete resistors connected in series with the charge electrodes. The resistance of the bulk resistive material or discrete resistors limits current flow to the charge electrodes in the event of ground faults. Van Breemen et al., while effective for most charge electrode ground faults, may not protect against faults occurring toward the charge electrode power supply and may also entail construction problems due to the large number of charge electrodes which must be provided in many ink jet printers.

It is, thus, apparent that an improved arrangement is necessary to protect ink jet printer charge electrodes from damage due to inadvertent ground faults.

SUMMARY OF THE INVENTION

In accordance with the present invention, a protection circuit is provided to monitor each of one or more charge electrodes provided in an ink jet printer. The operational status of each charge electrode is determined by monitoring either the voltage level of the electrode or the current flowing to the electrode during normally stable periods of the operating cycle of the electrodes. If during such stable periods the voltage level is below a defined level or the current flow is above a defined level, a fault condition is indicated and the ink jet printer is shut down to avoid damage to the charge electrode plate.

The charge electrode protection circuit comprises means for monitoring each charge electrode; means for sampling the monitoring means during periodically occurring stable portions of the operating cycle of the charge electrodes; and means responsive to an output signal generated by the sampling means for clamping the output of the charge electrodes power supply to approximately ground potential upon the detection of a defective charge electrode. Once the sampling means detects a defective charge electrode, the sampling means is locked into a fault condition so that the ink jet printer can be restarted only by the operation of reset means for releasing the sampling means after the detected charge electrode fault has been corrected.

If the voltage level of the charge electrodes is monitored, comparator means are provided for comparing the potential on each charge electrode to a defined reference potential and a fault condition is indicated if the potential of a charge electrode goes below the reference potential. Since a fault condition can be indicated during normal operation of the ink jet printer, the sampling means comprises a gated flip-flop circuit which is gated to receive the output signal from the comparator means during stable portions of the operating cycle of the charge electrodes so that only true charge electrode fault conditions are registered in the sampling means.

If the current flowing to each of the charge electrodes is monitored, a fault condition is indicated if the current flow to any electrode exceeds a defined level. Here again, fault conditions can be indicated during normal operation of the ink jet printer and so the sampling means comprises a gated flip-flop circuit which is gated during normally stable portions of the operating cycle of the charge electrodes so that only true charge electrode fault conditions are registered in the sampling means.

Typically, at least one guard ink drop is deflected to an ink catcher between successive printing ink drops to define a guard zone. The guard zones reduce potential interference between the charge on a printing ink drop and the charge to be induced onto the succeeding printing ink drop. By providing at least one guard drop of known potential between successive printing drops, any interference can be accurately predicted and compensated. The preferred stable period of the operating cycle for the charge electrodes where a guard zone is used is the trailing edge of the signal which defines the guard zone. Two guard ink drops are interposed between successive printing ink drops in the ink jet printer as disclosed which incorporates the present invention.

In the preferred embodiments of the present invention, the ink jet charge electrode protection circuit is included within the integrated circuitry which provides the charging potentials to the charge electrodes.

It is, therefore, an object of the present invention to provide an improved protection circuit for charge electrodes utilized in ink jet printers; to provide an improved protection circuit for charge electrodes used in ink jet printers by monitoring the voltage on the charge electrodes or the current provided to the charge electrodes during stable portions of the electrical operating cycle of the charge electrodes; and to provide an improved protection circuit for charge electrodes utilized in ink jet printers wherein the protection circuit comprises a portion of the integrated circuitry for providing charging potentials to the charge electrodes.

Other objects and advantages of the present invention will be apparent from the following description, the accompanying drawings and the appended claims.

DETAILED DESCRIPTION OF THE INVENTION

Figure 1:
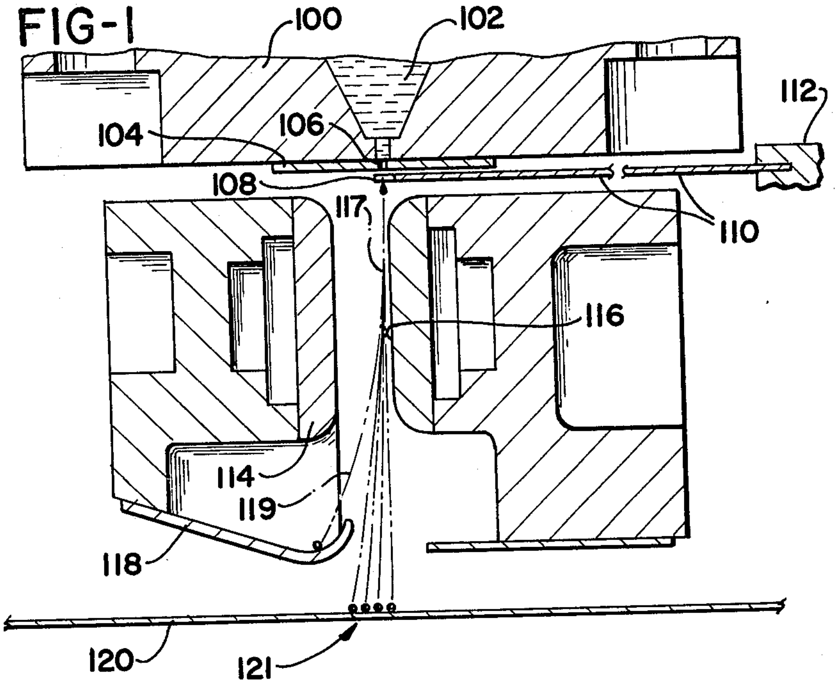
FIG. 1 is a sectional side view of a portion of an ink jet printer showing the formation, charging, deflection and deposition of ink drops.

The present invention relates to ink jet printers wherein tiny drops of printing ink are deposited on a web of paper or other material to form printed characters. A small portion of such a printer is shown in cross-section in FIG. 1 to illustrate the formation, charging, deflection and deposition of such drops. A means for forming a plurality of streams of ink drops includes a housing 100 which defines an ink reservoir 102 which reservoir is closed at the bottom by an orifice plate 104. The orifice plate 104 defines a plurality of orifices or openings 106 which are positioned along the plate 104 to form a row extending into and out of the plane of the drawing of FIG. 1.

An electrically conductive ink is supplied to the reservoir 102 and flows downwardly through the openings 106 to form elongated ink filaments which then break into streams of ink drops. In order to facilitate this drop formation, a mechanical oscillator (not shown) is provided to mechanically stimulate the orifice plate 104 or alternatively pressure waves are applied to the conductive ink in the reservoir 102. As a result, the length of the ink filaments, the size of the drops formed and the spacing between the drops are substantially uniform.

The row of ink drop streams is arranged so that each stream passes through one of a plurality of notch charge electrodes 108 formed into the edge of a retractable charge electrode plate 110. The charge electrode plate 110 is secured to and partially supported by a retractable member 112 so that the charge electrode plate 110 can be moved away from the ink streams during periods of instability of the streams, for example, at start-up of the ink jet printer.

The ink drops in each stream are individually and selectively charged by the potential placed on the respective charge electrode 108 of the charge electrode plate 110. Deflection electrodes 114, 116 are charged to provide an electrical field through which the ink drops 117 pass. Charged drops are deflected in a set of defined trajectories dependent upon the charges placed upon the individual ink drops and uncharged drops pass undeflected through the electrical field.

An ink drop catcher 118 is positioned below the deflection electrodes 114, 116. The catcher 118 is positioned so that drops 119 which are deflected beyond a defined trajectory are not deposited on a web of material 120 which is typically moved through the printer, but are intercepted and removed by the catcher. Thus, drops are either deposited at one of a plurality of locations 121 on the web of material 120 or caught by the catcher 118 dependent upon the charge induced upon the drops. The row of openings 106 is preferably obliquely positioned relative to the direction of movement of the web of material 120 through the printer for reasons known in the art and described in U.S. Pat. No. 4,085,409.

Figure 2:
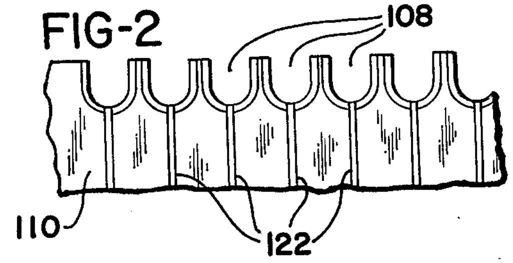
FIG. 2 is a partial plan view of a charge electrode plate showing charge electrodes in greater detail.

The charge electrode plate 110 defines a plurality of charge electrodes which are formed as a row of notches along the forward edge of the plate. When the charge electrode plate 110 is inserted to the operating position shown in FIG. 1, the notch charge electrodes 108 are aligned with the orifices 106 through the orifice plate 104. A plan view of a portion of the charge electrode plate 110 is shown in FIG. 2. The charge electrodes 108 each comprise a thin coating of electrically conductive material applied to the inside surfaces of the notches formed in the insulating charge electrode plate 110. Appropriate charge inducing potentials are provided to each of the charge electrode notches 108 through electrical conducting paths 122.

The art of ink jet printing is well developed and additional background information and more detailed information relative to the structure and operation of ink jet printers can be obtained by reference to the following U.S. Pat. Nos.: 3,604,980; 3,618,858; 3,701,998; 3,710,998; 3,739,393; 3,913,719; 4,035,812; and 4,085,409, which are assigned to the same assignee as the present invention and are hereby incorporated by reference.

A charge is induced onto each ink drop by one of the charge electrodes 108 by a charging potential that ranges between approximately 0 and 75 volts. Typically, charging potentials between 0 and 20 volts are used to charge printing ink drops which are deposited on the web 120 and a 75 volt potential is used to charge drops which are deflected to the drop catcher 118. Since relatively small changes in the charge induced on an ink drop can vary the trajectory along which the drop travels and, hence, its deposited position on the web 120, it is important to ensure that precise charges are induced onto each printing ink drop.

To this end, successive printing ink drops are separated by two guard drops. The 75 volt potential is used to charge the guard drops to ensure that they are deflected to the catcher 118. If successive printing ink drops proceeded adjacent to one another, the varying charges induced on each of the printing ink drops would tend to influence the charge on the succeeding drop in a manner which could not be predicted. By providing two guard drops which are charged by the 75 volt charging potential applied to the charge electrodes 108, a predictable buffer is provided between successive printing ink drops. Since the effect of the guard drops is predictable, the charge induced on printing ink drops is more precisely defined by the charging potential applied to the charge electrodes. In this way, the trajectory for individual printing ink drops can be more accurately determined.

A 75 volt power supply is coupled to the charge electrodes 108 to provide the charging potential for guard drops. For a period of time corresponding to every third drop, i.e., the printing ink drops, a print enable signal is generated. If a printing ink drop is to be deposited on the web 120 to print a character, the charge groove corresponding to the ink drop is pulled down to a print charge voltage level. The print charge voltage level charges the ink drop so that it will follow a desired trajectory and impinge on the web 120 at a defined location. The ink drop thus deflected forms a desired character in collection with other appropriately deflected ink drops as is well known in the art. Of course, not all printing ink drops are deposited on the web 120 and, accordingly, a printing ink drop may be charged by the 75 volt charging potential and deflected to the ink drop catcher 118.

The charge electrodes 108 and the corresponding conductors 122 are formed of thin layers of electrically conductive material, such as gold film. Such thin conductors can be damaged by high current flow in the event that the charge electrodes 108 are inadvertently connected to ground potential, for example, by a build-up of electrically conductive ink. In accordance with the present invention, damage to the charge electrode plate 110 is prevented by monitoring the charge electrodes to detect ground fault conditions and, upon detection, to clamp the 75 volt power supply to approximately ground potential and stop the ink jet printer.

In the present invention, each charge electrode is individually monitored during a normally stable portion of the operating cycle for the charge electrode. In particular, at the end of the guard zone defined by the two guard drops which are deflected to the catcher 118 between printing ink drops. At this time, the voltage on the charge electrodes should be stabilized to approximately 75 volts and the current flow to the electrodes should be negligible. By monitoring each charge electrode at this point in its operating cycle, a ground fault on any charge electrode can be detected by reduced voltage on the electrode or excessive current flow to the electrode. By thus sampling or keying the fault detection system at the end of the guard zone, the sensitivity of the fault detection system can be improved.

The charge time corresponding to each ink drop is approximately equal to seven microseconds and, hence, the charging voltage applied to the charge electrodes must be rapidly changed from the 75 volt guard drop deflecting potential to the lower printing voltage levels. Such rapid voltage changes on the charge electrodes produce current flow and introduce voltage transients or noise on the charge electrodes. By monitoring the charge electrodes at the end of the guard zone, the most stable portion of the voltage and current waveforms are selected which permits greater sensitivity of the charge electrode monitoring circuitry.

Figure 3:
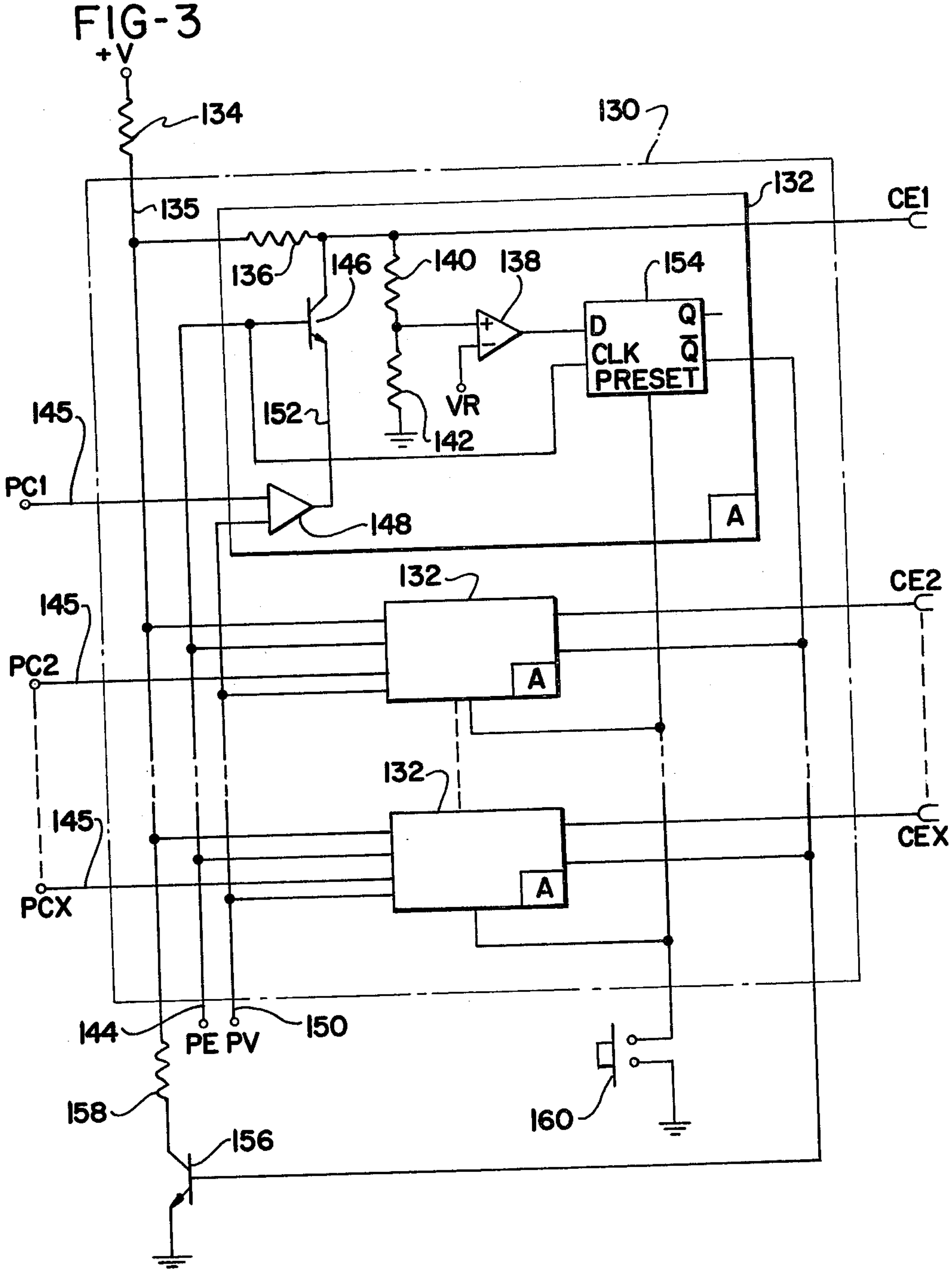
FIG. 3 is a schematic diagram of a voltage sensing embodiment of the improved charge electrode protection circuit.

FIG. 3 is a schematic diagram of a circuit for providing the charging potentials to a plurality of the charge electrodes 108. The circuit of FIG. 3 also provides for monitoring the voltage levels of each of the plurality of charge electrodes to detect whether one or more of the electrodes has a ground fault. If a ground fault is detected, the voltages applied to the charge electrodes can be reduced and the printer can be stopped before the charge electrodes are damaged.

The circuitry of FIG. 3 is preferably formed as an integrated circuit chip 130 which includes typically six, eight or more charge electrode control circuits 132 for providing the charging potentials and monitoring the individual charge electrodes CE1-CEX. The number of control circuits 132 provided on a single integrated circuit chip 130 depends upon the integrated circuit technology utilized, the system organization and limitations imposed by the number of connections which must be made to the circuit chip.

Each circuit chip 130 receives a 75 volt potential +V through a resistor 134. The 75 volt potential is fed to the individual charge electrode control circuits 132 via a power bus 135. Since each of the control circuits 132 is identical, only the control circuit for the first charge electrode CE1 on the circuit chip 130 is shown in detail in FIG. 3 and will be described herein.

The 75 volt potential +V is connected through resistors 134 and 136 to the charge electrode CE1. The voltage on the charge electrode CE1 is monitored by a comparator 138. The voltage input signal from the charge electrode CE1 to the comparator 138 is scaled by a resistor divider circuit comprising resistors 140 and 142. As long as the signal on the positive input of the comparator 138 is above the reference voltage, $V_R$, connected to the negative input of the comparator 138, the output signal is a high voltage level or a logical "1". If the signal on the positive input of the comparator 138 goes below the reference voltage, $V_R$, the output signal of the comparator 138 goes to a low voltage level or a logical "0".

While the charge electrode CE1 is at the 75 volt potential, ink drops passing through the electrode receive a sufficiently high charge so that they are deflected to the appropriate one of the drop catcher 118 due to the electrical field caused by the charge on the deflection electrodes 114, 116. When a print drop is to be deposited on the web 120, the voltage level of the charge electrode CE1 is lowered to a selected voltage level between 0 and 20 volts, for example, one of the step voltage levels 0, 5, 10, 15 or 20 volts, dependent upon the trajectory desired for the ink drop. The potential on the charge electrode is lowered to one of the printing voltage levels if a gating signal is received on both the print enable PE conductor 144 and the corresponding print command PC conductor, i.e., PC1 for charge electrode CE1, of the conductors 145.

The print enable signal on the print enable conductor 144 activates a transistor 146. A voltage gate 148 provides the print voltage PV connected to a conductor 150 on its output 152 if the print command signal connected to the voltage gate 148 is active, i.e., the PC1 signal in the case of the charge electrode CE1. Thus, with coincident print enable and print command signals applied to the control circuit 132 for the charge electrode CE1, the voltage gate 148 provides a print voltage, i.e., 0, 5, 10, 15 or 20 volts, on its output 152 and the charge electrode CE1 is pulled to the print voltage by the active transistor 146. After the printing ink drop has been charged with the print voltage applied to the charge electrode, the active print enable and print command signals are removed and the charge electrode CE1 returns to the 75 volt guard drop charging potential.

The output of the voltage comparator 138 is sampled by means of a D flip-flop circuit 154. The D flip-flop 154 is clocked by the print enable signal on the conductor 144. Each time the input signal on the clock input of the D flip-flop goes from a low voltage level or logical "0" to a high voltage level or logical "1", the signal on the D input of the flip-flop is gated to the Q output with the $\overline{Q}$ output signal being the inverse of the Q output signal. As long as the clock input signal remains at a constant voltage level, either high or low, or changes from a high voltage level to a low voltage level, the outputs Q and $\overline{Q}$ remain stable and are not affected by the signal on the D input of the flip-flop.

By the use of the D flip-flop, the electrical status and in particular in the embodiment shown in FIG. 3, the voltage level of each charge electrode can be monitored during a stable portion of the operating cycle of the charge electrode and preferably at the end of the guard zone. At that time, the voltage level on the charge electrode has stabilized to approximately 75 volts, unless a ground fault pulls the voltage down toward ground potential. Under normal operating conditions, the 75 volt potential maintains a logical "1" signal on the output of the comparator 138. The "1" signal from the comparator 138 is gated into the corresponding D flip-flop 154 on the "0" to "1" transition or leading edge of the print enable pulse which signals the beginning of a print opportunity. Thus, for normal operation, the Q output of the D flip-flop remains at a high voltage level and the $\overline{Q}$ output remains at a low voltage level.

If a ground fault occurs on the charge electrode, the output signal from the comparator 138 goes to a logical "0" and is gated through to the Q output on the leading edge of the next print enable pulse. The $\overline{Q}$ output goes to a high voltage level and activates transistor 156 which draws the voltage level of the power bus 135 to a few volts above ground potential due to the low resistance value of the collector resistor 158 connected to the transistor 156. The activation of the transistor 156 maintains the low voltage on the charge electrodes associated with the integrated circuit chip 130 until the fault has been corrected and the associated D flip-flop has been preset by connecting a low potential to the preset input through a switch 160. The switch 160 is indicated as a momentary operate electrical switch; however, the D flip-flops 154 of the control circuits 132 are typically preset by a printer control system (not shown) to re-enable the operation of the ink jet printer after the defect has been cleared.

Figure 4:
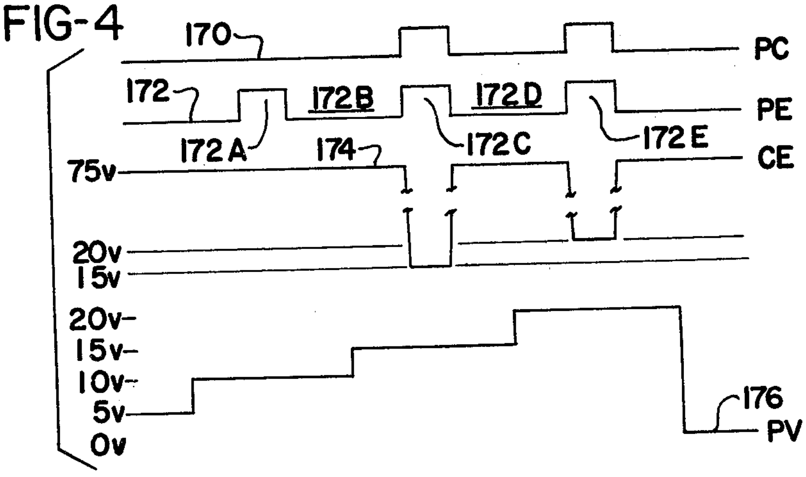
FIG. 4 shows typical waveforms encountered during normal operation of a charge electrode in an ink jet printer.

FIG. 4 shows representative electrical waveforms for three consecutive ink drops passing through a given charge electrode. The print command signal 170 indicates that the ink drop is to be deposited on the web of material 120 rather than deflected to the drop catcher 118. The print enable signal 172 includes positive pulses defining each ink drop printing period or print opportunity. Waveform 174 is the voltage waveform produced on a charge electrode in response to the print command signal 170 and the print enable signal 172. Finally, the print voltage signal 176 provides the stepped print voltages to the voltage gates 148 of the ink jet printer.

The low voltage levels of the print enable signal 172 define the guard zones for the ink jet printer. Since two guard drops are passed for each printing drop, the guard zones are approximately two times the length of the active print enable pulses. During these periods of time, i.e., the guard zones, the voltage level on the charge electrodes is maintained at approximately 75 volts.

The first possible print opportunity shown in FIG. 4 is the print enable PE pulse 172A. The drop corresponding to this print opportunity is not to be passed to the print medium but is to be deflected to the ink drop catcher, since the print command PC signal is at a low voltage level. Accordingly, the voltage level on the charge electrode CE remains at 75 volts. The guard zone 172B maintains the charge electrode at approximately 75 volts so that two guard drops are appropriately charged and deflected to the ink drop catcher 118.

At the second print opportunity 172C, a print command is present and the voltage level of the charge electrode is lowered to the print voltage corresponding to this print opportunity, i.e., 15 volts as shown in FIG. 4, and then returned to the 75 volt level during the guard cycle 172D. Due to the large voltage changes and rapid transition times of the voltage level on the charge electrode, the ideal voltage waveform for the charge electrode shown in FIG. 4 has considerable noise induced onto it particularly following the voltage transition points. However, the voltage on the charge electrode is stabilized at approximately 75 volts by the end of each guard zone (for example, 172B, 172D) and, hence, it is this point which has been chosen to sample the monitored condition of the charge electrodes.

Finally, the print opportunity 172E is coincident with a print command so that the voltage level of the charge electrode is again reduced to the print voltage defined by the print voltage waveform 176, i.e., 20 volts as shown in FIG. 4, and then returned to the 75 volt guard zone level upon termination of the active print enable pulse 172E.

It should be noted that ground fault conditions would be indicated during normal operation due to the excursions of the voltage on the charge electrodes. Even so, in accordance with the present invention, ground faults are quickly and accurately detected by sampling the charge electrode monitors during the stable terminal portion of the guard zones. The samples are conveniently taken by the leading edge of active print enable pulses which signal the end of the guard zones.

Figure 5:
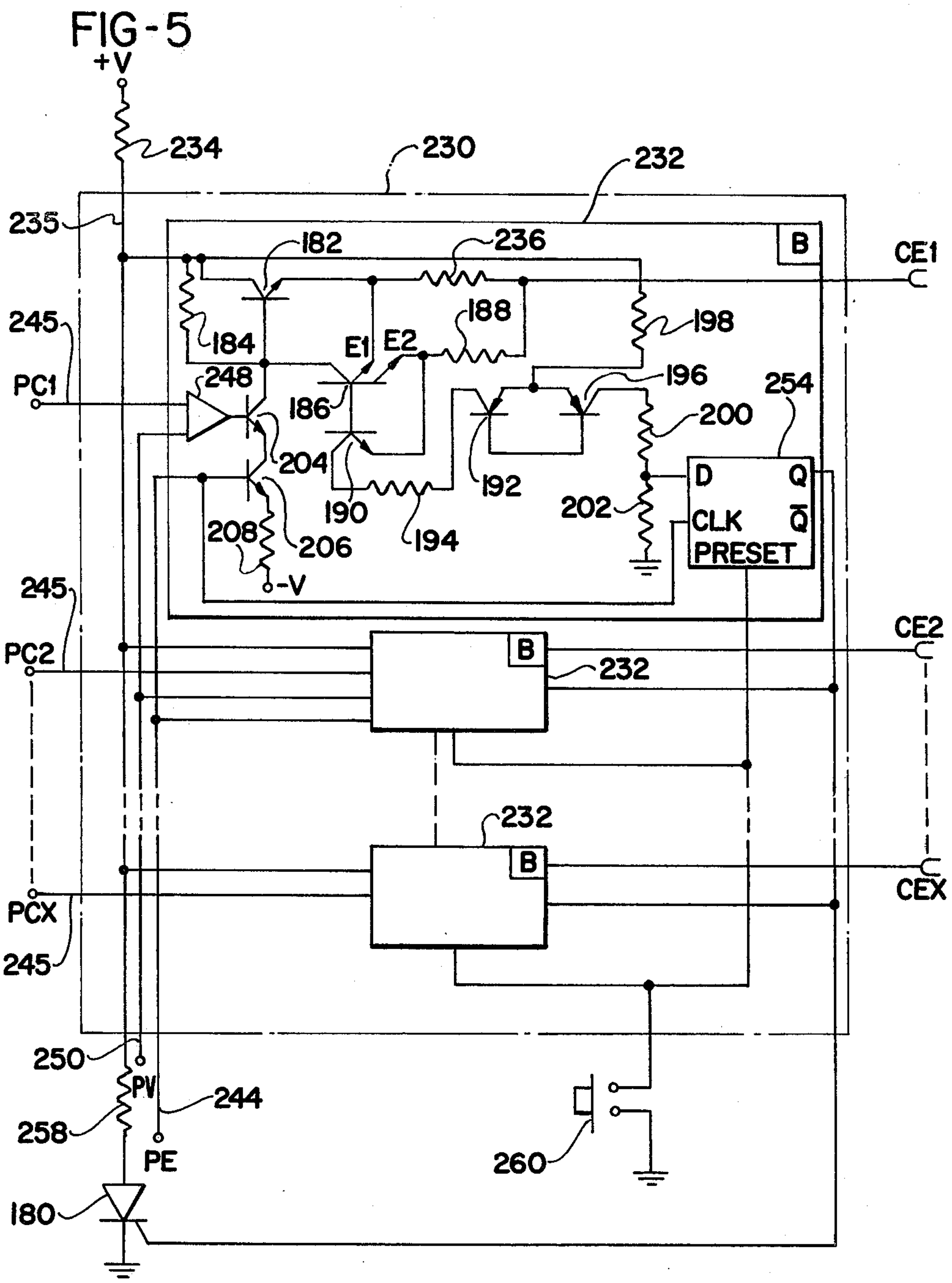
FIG. 5 is a schematic diagram of a current sensing embodiment of the improved charge electrode protection circuit.

A current sensing embodiment of the improved charge electrode protection circuit is shown in FIG. 5. This embodiment may be preferred for some integrated circuit technologies which may be utilized to construct the protection circuit. Since the embodiments shown in FIGS. 3 and 5 are connected to the same inputs and outputs, many elements of the two embodiments correspond to one another. Accordingly, similar elements in FIG. 5 have been given the same numeric identification but in the two hundred series of numbers. One change in the circuitry external to the circuit chip in the embodiment of FIG. 5 is that an SCR 180 is used to clamp the chip power bus 235 to a few volts above ground potential upon the detection of a ground fault. When such a silicon controlled rectifier (SCR) is utilized, the +75 volt power supply +V must be effectively disconnected from the SCR as the D flip-flops are preset to return the ink jet printer to service after correction of a ground fault. Otherwise, the SCR 180 will remain activated and continue to clamp the power bus 235. Of course, the SCR 180 may be deactivated by other means well known in the art, such as a current reversing capacitor which is selectively connected across the SCR to deactivate it.

Each circuit chip 230 receives a 75 volt potential +V through a resistor 234. The 75 volt potential is fed to individual charge electrode control circuits 232 via a power bus 235. Since each of the control circuits 232 is identical, only the control circuit for the first charge electrode CE1 on the circuit chip 230 is shown in detail in FIG. 5 and will be described herein.

The 75 volt potential +V is connected through resistors 234, 236 and the transistor 182 which is normally biased on by a resistor 184. The current flowing to the charge electrode CE1 is monitored by sensing the voltage across the resistor 236. The double emitter transistor 184 has its two emitters E1 and E2 connected across the resistor 236 with the emitter E2 being connected to the charge electrode side of the resistor 236 through a resistor 188.

As the current flow through the resistor 236 to the charge electrode CE1 increases, the voltage across the resistor 236 increases. The emitter E2 is forward biased thus favoring current flow; however, the emitter E1 is reverse biased and prevents current flow. When a defined voltage level and, hence, current flow to the charge electrode is attained, the emitter E2 conducts current in a reverse direction due to a Zener effect. At this point, base current flows in the dual emitter transistor 186 and also in the transistor 190. Collector current in the transistor 190 activates the transistor 192 through the resistor 194. Transistors 192 and 196 comprise a "current mirror bridge" and current in the transistor 192 is mirrored into the transistor 196. Power is provided to the current mirror bridge through a resistor 198. Collector current in the transistor 196 flows through resistors 200 and 202 to generate a high voltage level or logical "1" at the D input to a D flip-flop 254. The D flip-flop 254 is activated by the leading edge of each print enable pulse (172A, 172C and 172E in FIG. 4) as previously described with reference to the operation of the D flip-flop 154 shown in FIG. 3. However, in this case, since a high signal on the D input of the D flip-flop 254 indicates a fault condition, the Q output of the flip-flop is used to activate the SCR 180.

The print voltages are applied to the charge electrodes via a voltage gate 248 which is driven by the print voltage on the conductor 250 and the print command signal on PC1 of the print command conductors 245. If a print command signal is received, the corresponding print voltage level is applied to the output of the voltage gate 248. In the circuit shown in FIG. 5, the output of the voltage gate 248 is applied to the base of a transistor 204 which passes the voltage level to the charge electrode CE1 through the transistor 182 and the resistor 236 if a transistor 206 is simultaneously activated by a print enable signal on a conductor 244. The emitter of the transistor 206 is connected to a negative potential −V through a resistor 208 so that the charge electrode CE1 can be drawn to 0 volts to correspond to a 0 print voltage.

Here again, by sampling charge electrode monitor circuits at the stable, terminating portion of each guard zone, ground faults can be accurately detected. This is so even though fault conditions can be indicated by the monitor circuits during normal operation since currents flow in the control circuits due to the magnitude and rapid changes of the voltage levels applied to the charge electrodes.

While the forms of apparatus herein described constitute preferred embodiments of this invention, it is to be understood that the invention is not limited to these precise forms of apparatus and that changes may be made therein without departing from the scope of the invention which is defined in the appended claims.

What is claimed is:

1. In an ink jet printer comprising print head means for forming one or more streams of ink drops directed toward a web of material to be printed upon, one or more charge inducing means corresponding in number to said streams of ink drops and being individually associated with and positioned adjacent to respective ones of said streams of ink drops, circuit means for providing selected charging potentials to each of said charge inducing means, deflection means for providing an electric field through which said streams of drops pass to deflect charged drops into defined trajectories and permit uncharged drops to pass undeflected, and catcher means positioned for receiving drops deflected beyond a defined trajectory to prevent those drops from being deposited upon said web, the improvement comprising:

means for monitoring each of said charge inducing means;

means for sampling said monitoring means at periodic time intervals with said sampling occurring during normally stable periods of the operating cycle of said charge inducing means; and means responsive to said sampling means for clamping said circuit means when said sampling means indicates that said charge inducing means is defective whereby the charging potential provided to each of said charge inducing means is limited to approximately ground potential.

2. The ink jet printer of claim 1 wherein said sampling means is locked into a fault condition upon detecting that said charge inducing means is defective and further comprising reset means for releasing said sampling means from said fault condition after the defect of said charge inducing means has been corrected.

3. The ink jet printer of claim 2 wherein said monitoring means comprises comparator means for comparing the voltage potential of each of said charge inducing means to a defined reference potential and generating a fault condition signal if any of said charge inducing means falls below said reference potential, and said sampling means comprises a gated flip-flop circuit.

4. The ink jet printer of claim 2 wherein said monitoring means comprises current sensing means for monitoring the current flow to each of said charge inducing means and generating a fault condition signal if said current flow exceeds a defined level, and said sampling mans comprises a gated flip-flop circuit.

5. The ink jet printer of claim 1 wherein at least one guard ink drop is deflected to said catcher means between successive printing ink drops to define a guard zone for reducing the potential interference of the charge on a printing ink drop with the charge to be induced onto the succeeding printing ink drop wherein said sampling means samples said monitoring means at the end of said guard zone.

6. The ink jet printer of claim 5 wherein two guard ink drops comprise said guard zone.

7. The ink jet printer of claim 1 wherein said circuit means comprises an integrated circuit and said improvement is included therein.

* * * * *